(12) United States Patent
Yoshida et al.

(10) Patent No.: US 10,343,226 B2
(45) Date of Patent: Jul. 9, 2019

(54) CUTTING INSERT AND CUTTING TOOL

(71) Applicant: TUNGALOY CORPORATION, Fukushima (JP)

(72) Inventors: Satoru Yoshida, Iwaki (JP); Keisuke Morita, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 0 days.

(21) Appl. No.: 15/765,200

(22) PCT Filed: Dec. 21, 2016

(86) PCT No.: PCT/JP2016/088082
§ 371 (c)(1),
(2) Date: Mar. 30, 2018

(87) PCT Pub. No.: WO2018/061227
PCT Pub. Date: Apr. 5, 2018

(65) Prior Publication Data
US 2019/0054550 A1  Feb. 21, 2019

(30) Foreign Application Priority Data
Sep. 27, 2016 (JP) ................. 2016-187701

(51) Int. Cl.
*B23C 5/20* (2006.01)
*B23C 5/22* (2006.01)
*B23B 27/14* (2006.01)

(52) U.S. Cl.
CPC ............. *B23C 5/207* (2013.01); *B23B 27/14* (2013.01); *B23C 5/20* (2013.01); *B23C 5/223* (2013.01);
(Continued)

(58) Field of Classification Search
CPC .... B23C 2200/0477; B23C 2200/0483; B23C 2200/12; B23C 2200/121;
(Continued)

(56) References Cited

U.S. PATENT DOCUMENTS 5,382,118 A * 1/1995 Satran ................. B23C 5/06
407/113
2007/0003384 A1* 1/2007 Smilovici ............. B23C 5/2221
407/113
(Continued)

FOREIGN PATENT DOCUMENTS

KR  10-2010-0120240 A  11/2010
WO  2014/081010 A1  5/2014
WO  2015/156373 A1  10/2015

*Primary Examiner* — Willmon Fridie, Jr.
(74) *Attorney, Agent, or Firm* — Studebaker & Brackett PC

(57) ABSTRACT

A cutting insert comprises: a first end surface and a second end surface which are opposed to each other; a peripheral side surface which extends so as to connect the first end surface and the second end surface; a first cutting edge which is arranged in an intersecting edge between the first end surface and the peripheral side surface; and a second cutting edge which is arranged in an intersecting edge between the second end surface and the peripheral side surface. The peripheral side surface includes a first flank which is connected to the first cutting edge and an intermediate peripheral side surface portion which is arranged closer to the second end surface than the first flank. The first flank extends in a direction perpendicular to the first end surface. The intermediate peripheral side surface portion protrudes outward from the first flank.

7 Claims, 8 Drawing Sheets

(52) U.S. Cl.
CPC .................. *B23C 2200/0483* (2013.01);
*B23C 2200/243* (2013.01); *B23C 2200/286*
(2013.01); *B23C 2200/361* (2013.01); *B23C*
*2210/165* (2013.01); *B23C 2210/202* (2013.01)

(58) Field of Classification Search
CPC ........ B23C 2200/123; B23C 2200/125; B23C
2200/126; B23C 2210/202; B23C 5/2221
See application file for complete search history.

(56) References Cited

U.S. PATENT DOCUMENTS

| | | | | |
|---|---|---|---|---|
| 2008/0044241 | A1* | 2/2008 | Koskinen | B23C 5/06 407/103 |
| 2009/0155005 | A1* | 6/2009 | Jansson | B23C 5/06 407/114 |
| 2011/0020080 | A1* | 1/2011 | Zettler | B23C 5/06 407/113 |
| 2013/0022417 | A1* | 1/2013 | Gesell | B23C 5/207 407/113 |
| 2013/0108387 | A1* | 5/2013 | Ishi | B23C 5/109 409/132 |
| 2014/0010605 | A1* | 1/2014 | Smilovici | B23C 5/06 407/42 |
| 2014/0348599 | A1* | 11/2014 | Kovac | B23B 27/1611 407/42 |
| 2016/0082528 | A1* | 3/2016 | Ballas | B23C 5/207 407/48 |
| 2017/0144235 | A1* | 5/2017 | Dagan | B23C 5/06 |

* cited by examiner

US 10,343,226 B2

CUTTING INSERT AND CUTTING TOOL

TECHNICAL FIELD

The present invention relates to a cutting insert and a cutting tool on which the cutting insert is mounted.

BACKGROUND ART

An example of a conventional cutting insert is referred to as a negative type cutting insert, as disclosed in Patent Document 1. The cutting insert disclosed in Patent Document 1 includes two end surfaces which are opposed to each other, a peripheral side surface which connects the two end surfaces, and cutting edges which are arranged in an intersecting edge between each of the end surfaces and the peripheral side surface. The peripheral side surface extends in a direction perpendicular to each end surface. In a negative type cutting insert, the arrangement of cutting edges in two end surfaces thereof results in a large number of usable cutting edges, which is economical.

CITATION LIST

Patent Documents

Patent Document 1: WO2015/156373

SUMMARY

Technical Problem

In a negative type cutting insert, when a cutting edge in one of the end surfaces thereof is used for cutting, residue generated during cutting may collide with an area thereof around a cutting edge, in the other end surface, which is not in use for cutting. If such situation causes damage to the area around the cutting edge, the cutting performance will not be exerted sufficiently when such cutting edge is used for cutting.

Solution to Problem

A cutting insert according to the present invention comprises: a first end surface and a second end surface which are opposed to each other; a peripheral side surface which extends so as to connect the first end surface and the second end surface; a first cutting edge which is arranged in an intersecting edge between the first end surface and the peripheral side surface; and a second cutting edge which is arranged in an intersecting edge between the second end surface and the peripheral side surface. The peripheral side surface includes a first flank which is connected to the first cutting edge and an intermediate peripheral side surface portion which is arranged closer to the second end surface than the first flank. The first flank extends in a direction perpendicular to the first end surface. The intermediate peripheral side surface portion protrudes outward from the first flank.

The cutting insert of the present invention is removably mounted on the cutting tool of the present invention.

DESCRIPTION OF EMBODIMENTS

Figure 1:
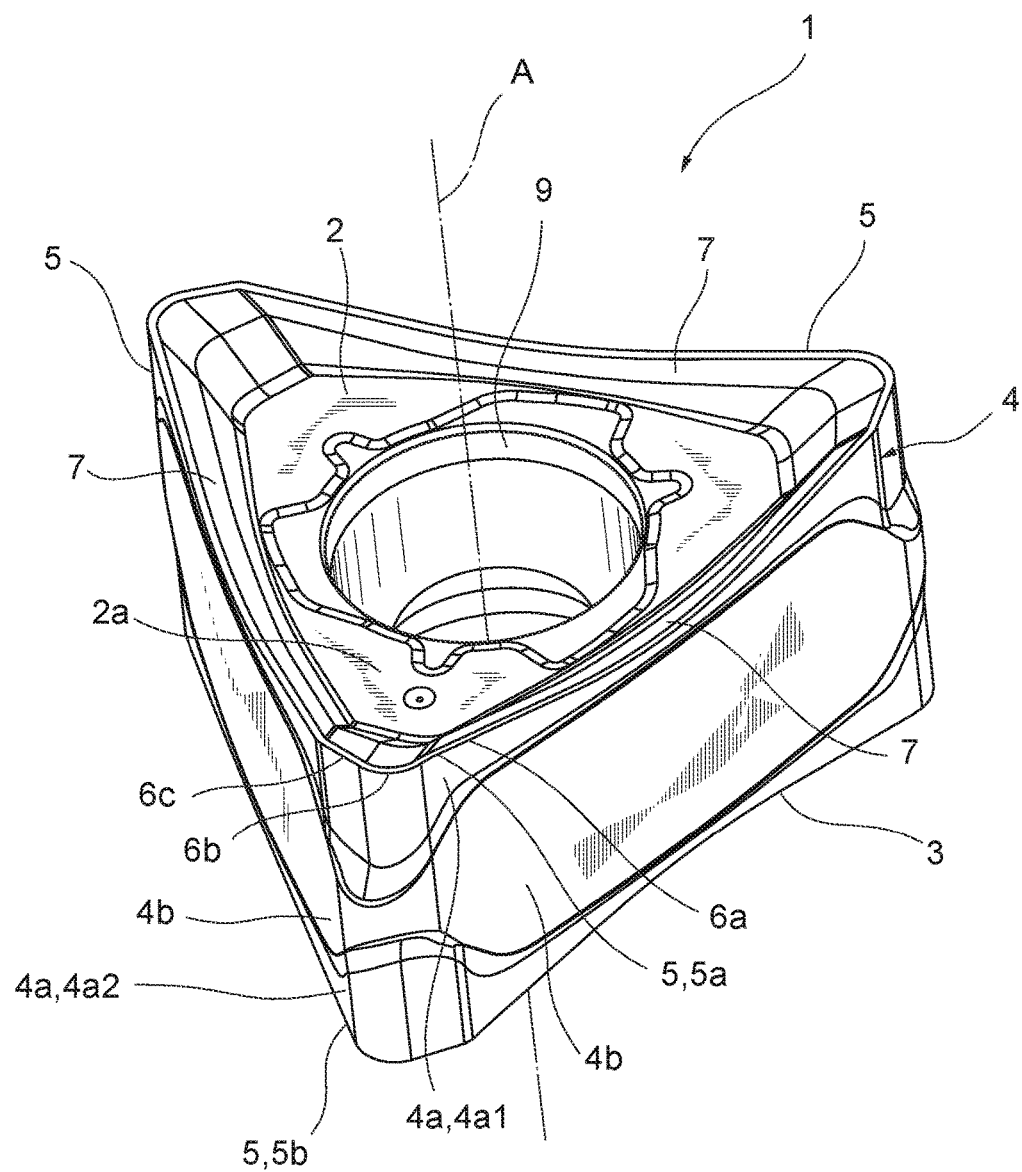
FIG. 1 is a perspective view of a cutting insert according to an embodiment.

An embodiment of the present invention will hereinafter be described with reference to the attached drawings. A cutting insert 1 according to the present embodiment is shown in FIGS. 1 to 6.

As shown in FIGS. 1 to 4, the cutting insert 1 includes end surfaces 2, 3 and a peripheral side surface 4. The end surfaces 2, 3 respectively include, in inner parts thereof, flat plane parts 2a, 3a. The end surfaces 2, 3 are opposed to each other. More specifically, the end surfaces 2, 3 are arranged such that the plane part 2a and the plane part 3a are parallel to each other. The peripheral side surface 4 extends so as to connect the end surface 2 and the end surface 3. Herein, for the purposes of description, the end surface 2 is referred to as an "upper surface 2," and the end surface 3 is referred to as a "lower surface 3." Further, a direction in which the upper surface 2 and the lower surface 3 are opposed to each other is referred to as a "thickness direction."

Figure 2:
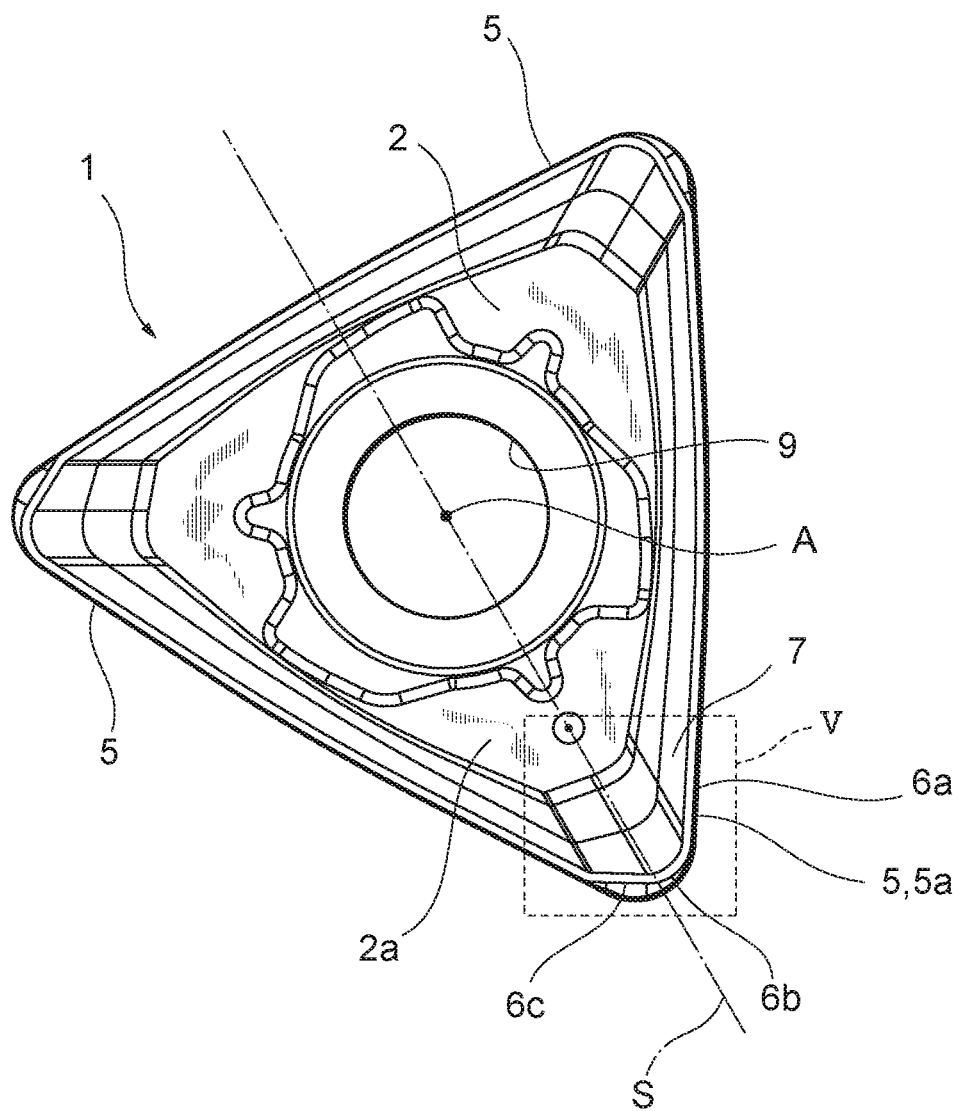
FIG. 2 is a plan view of the cutting insert of FIG. 1.

As shown in FIG. 2, the upper surface 2 has a substantially triangular shape. The diameter of the inscribed circle of the triangle is approximately 10 mm. The upper surface 2 includes three side edges and three corners. Herein, the term "side edge" refers to, in an end surface, an edge portion thereof which extends between the corners. More specifically, the term "side edge" refers to a portion of an edge of the upper surface other than the curved portions of the corners. A cutting edge 5 is arranged in each corner and the peripheral side edges. A portion of the upper surface 2 which is connected to the cutting edge 5 functions as a rake surface 7. As shown in FIG. 1, a portion of the peripheral side surface 4 which is connected to the cutting edge 5 functions as a flank 4a. It should be noted that the curvature radius of the corner is approximately 0.8 mm.

Figure 3:
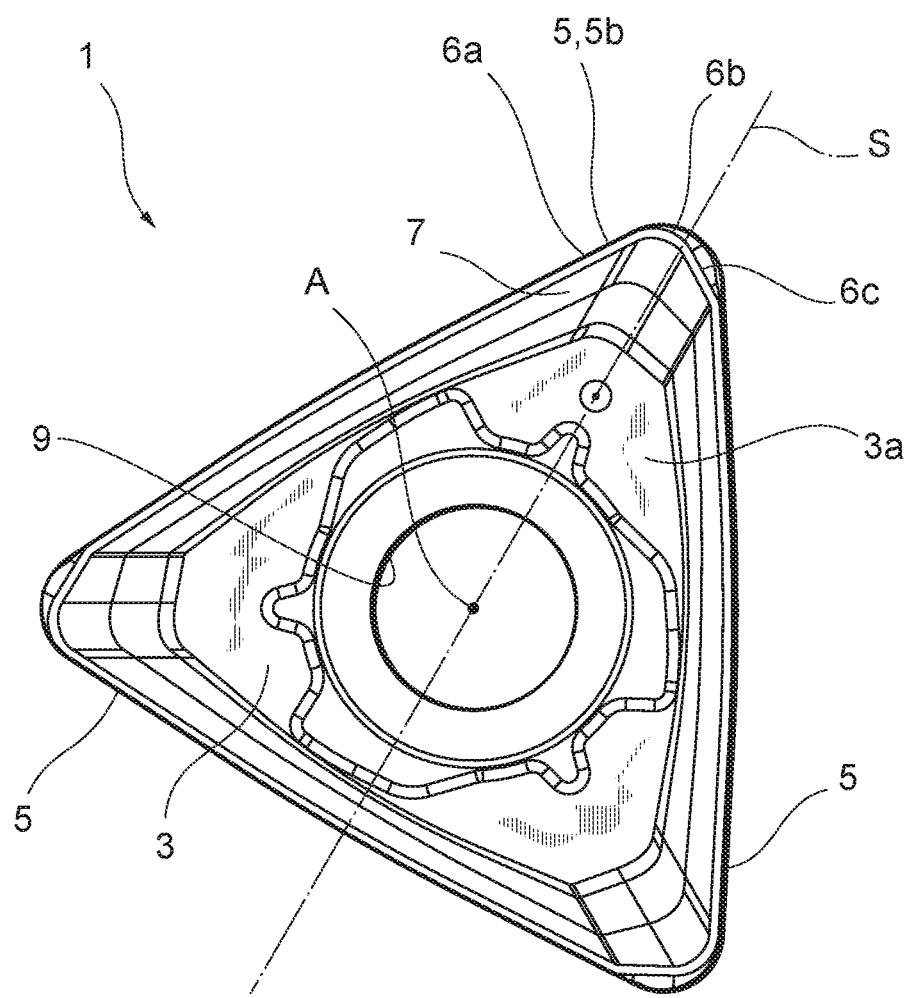
FIG. 3 is a bottom view of the cutting insert of FIG. 1.

As shown in FIG. 3, the lower surface 3 has a substantially triangular shape, in a similar manner to the upper surface 2. The lower surface 3 also includes three side edges and three corners. A cutting edge 5 is arranged in each corner of the lower surface 3 and the peripheral side edges. A portion of the lower surface 3 which is connected to the cutting edge 5 functions as a rake surface 7. A portion of the peripheral side surface 4 which is connected to the cutting edge 5 functions as a flank 4a.

In the cutting insert 1, six cutting edges 5 are provided in total—three for the upper surface 2 and three for the lower surface 3. Each cutting edge 5 includes a major cutting edge 6a, a corner cutting edge 6b and a minor cutting edge 6c. The major cutting edge 6a is arranged in a side edge and occupies a major part of one side edge. In other words, in the cutting insert 1, a major part of a side edge can be used as the major cutting edge 6a. The corner cutting edge 6b is arranged in each corner. The minor cutting edge 6c is arranged on the side opposite to the major cutting edge 6a across the corner cutting edge 6b. The minor cutting edge 6c is arranged between the corner cutting edge 6b and the major cutting edge 6a of the adjacent cutting edge 5.

Since the respective cutting edges 5 include differently shaped major cutting edges 6a and differently shaped minor cutting edges 6c, the cutting insert 1 does not have mirror symmetry. In other words, the upper surface 2 and the lower surface 3 are not mirror-symmetrical with each other. To put it another way, as viewed from a direction facing the upper surface 2, when a contour shape of the lower surface 3 is projected onto the upper surface 2, at least part of the projected contour shape of the lower surface 3 does not overlap with a contour shape of the upper surface 2. Such portion which does not involve overlapping is a portion mainly corresponding to the minor cutting edge 6c. The cutting insert 1 is a right-hand cutting insert.

As shown in FIG. 2, as viewed from the direction facing the upper surface 2, the major cutting edge 6a is curved so as to bulge outward.

Herein, as shown in FIGS. 1 and 2, one cutting edge 5 of the upper surface 2 is referred to as a "first cutting edge 5a." Further, as shown in FIGS. 1 and 3, one cutting edge 5 of the lower surface 3 is referred to as a "second cutting edge 5b." More specifically, in the plan view of FIG. 2, the cutting edge 5 arranged on the right-most side is referred to as the "first cutting edge 5a." Further, in the bottom view of FIG. 3, the cutting edge 5 arranged on the uppermost side is referred to as the "second cutting edge 5b."

Figure 4:
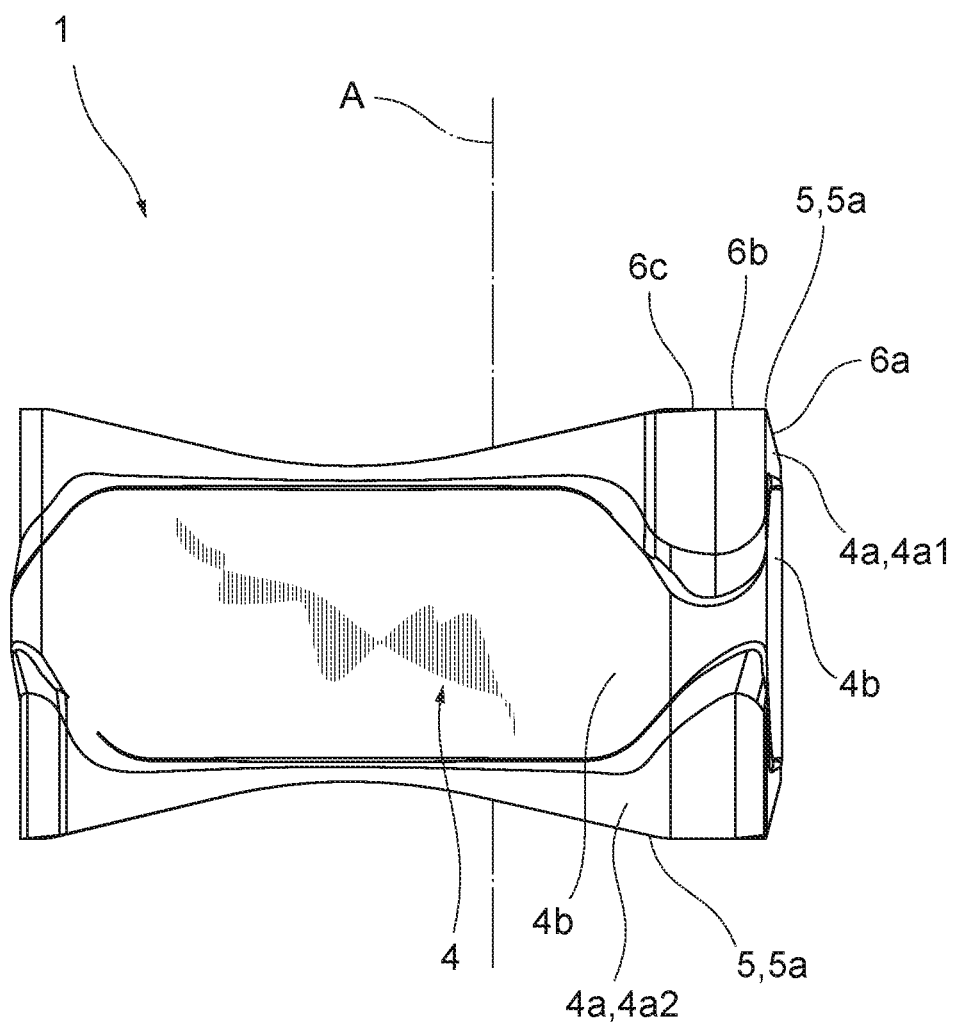
FIG. 4 is a front view of the cutting insert of FIG. 1.

As shown in FIG. 4, when the cutting insert 1 is viewed from a direction facing the flank 4a, the first cutting edge 5a is curved so as to be recessed downward. In particular, the first cutting edge 5a is curved so as to entirely create a smoothly recessed curve. Meanwhile, the second cutting edge 5b is curved so as to be recessed upward.

As shown in FIGS. 1 to 3, the cutting insert 1 is provided with a mounting hole 9 which penetrates the upper surface 2 and the lower surface 3. The upper surface 2 is of 120-degree rotational symmetry to a central axis A of the mounting hole 9. Similarly to the upper surface 2, the lower surface 3 is of 120-degree rotational symmetry to the central axis A of the mounting hole 9. The central axis A of the mounting hole 9 is also referred to as a reference axis A of the cutting insert 1.

The cutting insert 1 is analogous to a so-called negative type cutting insert. However, in the peripheral side surface 4 of the cutting insert 1, an intermediate portion thereof in a thickness direction protrudes outward. In other words, as shown in FIG. 1, the peripheral side surface 4 includes an intermediate peripheral side surface portion 4b which is located further outward than the flank 4a.

Herein, a flank 4a which is connected to the first cutting edge 5a of the upper surface 2 is referred to as a "first flank 4a1," and a flank 4a which is connected to the second cutting edge 5b of the lower surface 3 is referred to as a "second flank 4a2."

Figure 5:
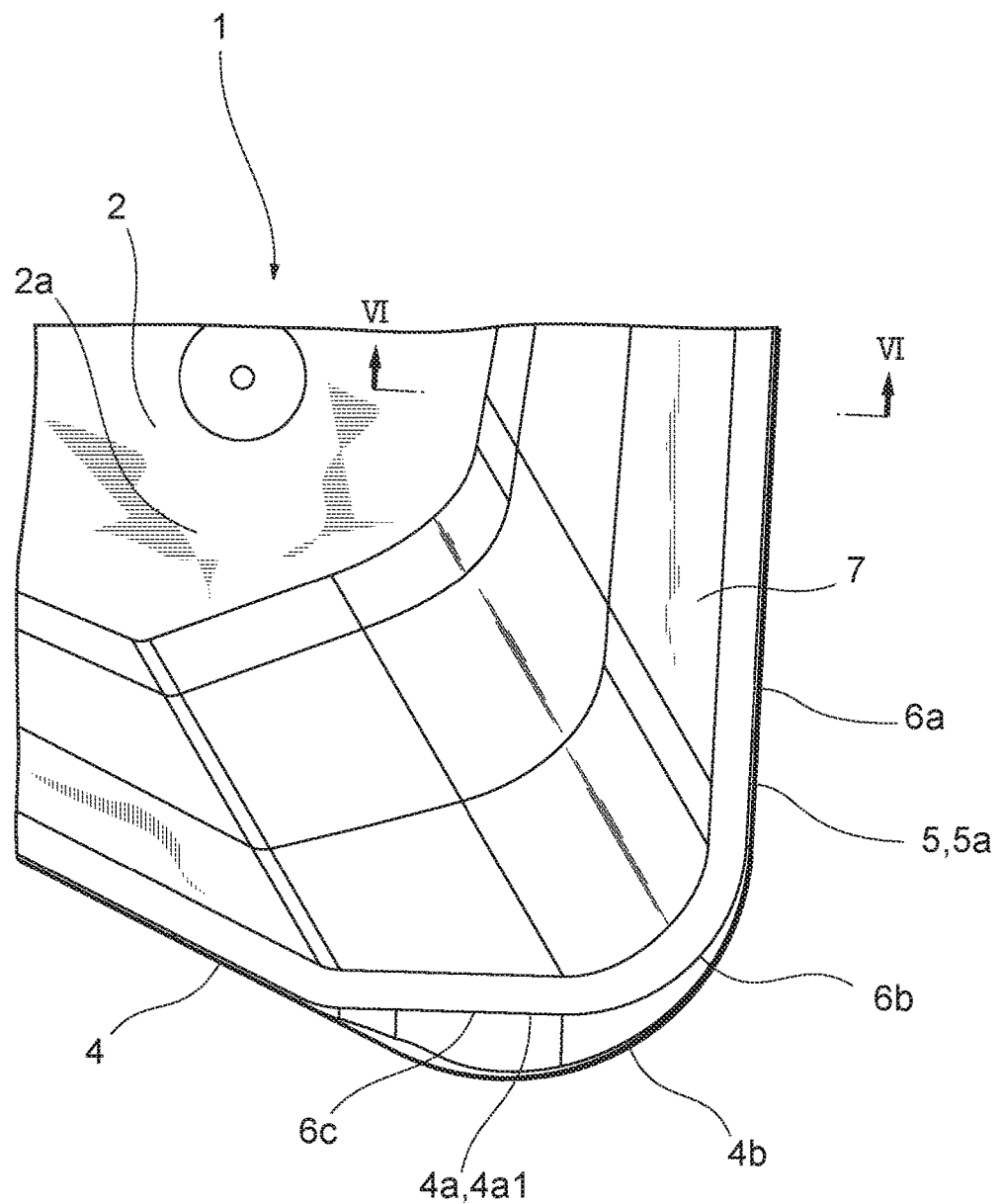
FIG. 5 is an enlarged view of a V part of FIG. 2.

The "intermediate peripheral side surface portion 4b being located further outward than the flank 4a" means that, in a plan view, the intermediate peripheral side surface portion 4b is located further outward than the flank 4a. In other words, as shown in FIG. 5, when the cutting insert 1 is viewed from the direction facing the upper surface 2, the intermediate peripheral side surface portion 4b is located further outward than the first flank 4a1. Similarly, when the cutting insert 1 is viewed from a direction facing the lower surface 3, the intermediate peripheral side surface portion 4b is located further outward than the second flank 4a2 (not shown).

In the peripheral side surface 4, a portion thereof which is connected to the major cutting edge 6a involves a small amount of outward protrusion. In the cutting insert 1, the intermediate peripheral side surface portion 4b is located further outward than the flank 4a, throughout the peripheral side surface 4.

The first flank 4a1 is not given a clearance angle. In other words, the first flank 4a1 extends in a direction perpendicular to the plane part 3a of the lower surface 3. The plane part 2a of the upper surface 2 is parallel to the plane part 3a of the lower surface 3. Therefore, the first flank 4a1 also extends in a direction perpendicular to the plane part 2a of the upper surface 2. To put it another way, an angle formed by the first flank 4a1 and the plane part 2a of the upper surface 2 is a right angle. Similarly, the second flank 4a2 extends in a direction perpendicular to the lower surface 3. The flank 4a extends in a direction perpendicular to the plane part 2a and the plane part 3a, throughout the peripheral side surface 4.

Figure 6:
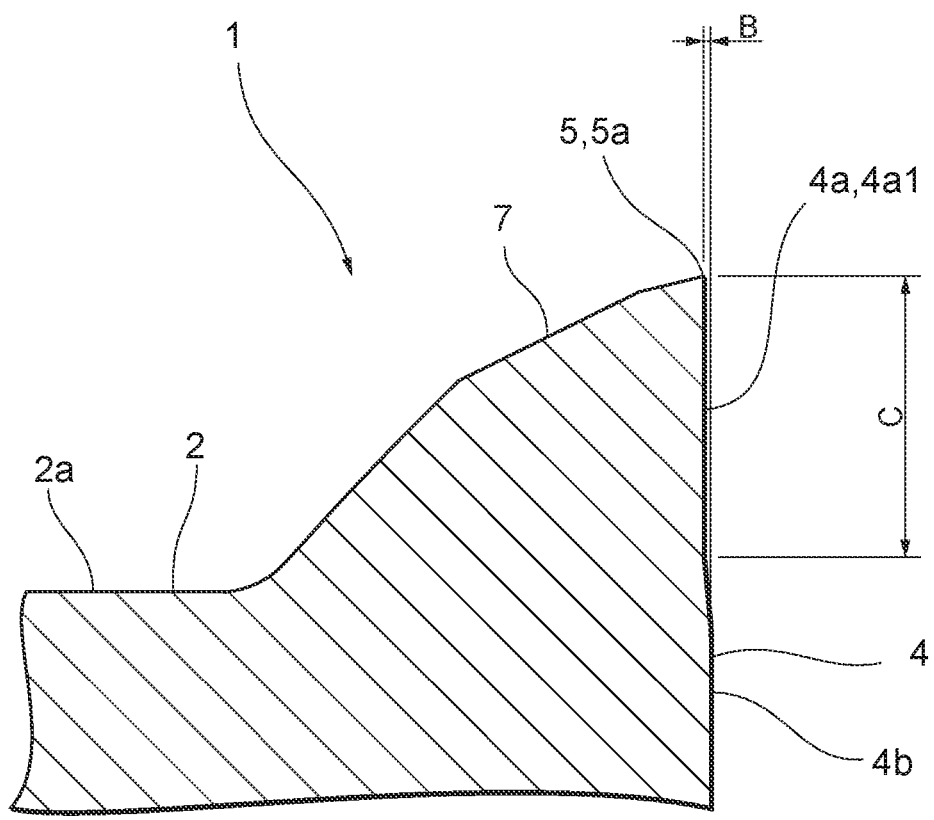
FIG. 6 is a cross-sectional view of a VI-VI cross section of FIG. 5.

As shown in FIG. 6, when regarding an amount of protrusion of the intermediate peripheral side surface portion 4b from the first flank 4a1, as denoted by B, the amount of protrusion B for the major cutting edge 6a is approximately 0.5 mm. The amount of protrusion B for each of the corner cutting edge 6b and the minor cutting edge 6c has a maximum value of 2 mm.

In the thickness direction, a distance from the cutting edge 5a of the upper surface 2 to the cutting edge 5b of the lower surface 3 has a maximum value of approximately 6 mm. Herein, as shown in FIG. 6, when regarding a width of the first flank 4a1 in the thickness direction, as denoted by C, the width C varies depending on the position. In the first flank 4a1, the width C of a portion thereof which is connected to the major cutting edge 6a has a minimum value of 0.5 mm and a maximum value of 2 mm; the width C of a portion thereof which is connected to the corner cutting edge 6b has a minimum value of 2 mm and a maximum value of 3 mm; and the width C of a portion thereof which is connected to the minor cutting edge 6c has a minimum value of 2 mm and a maximum value of 3 mm.

The shape of the lower surface 3 is the same as that of the upper surface 2. As shown in FIGS. 2 and 3, when defining an axis S so as to be orthogonal to the reference axis A and to penetrate the peripheral side surface 4, the cutting insert 1 has a shape of 180-degree rotational symmetry to the axis S.

As described above, the cutting insert 1 includes the three cutting edges 5 on the upper surface 2 side and the three cutting edges 5 on the lower surface 3 side. All six of the cutting edges 5 have the same shape. In other words, the shape of the second cutting edge 5b is 180-degree rotationally symmetrical with the shape of the first cutting edge 5a. Therefore, the cutting insert 1 is a double-side-use cutting insert, meaning that the six cutting edges 5 can be used for cutting.

As described above, the upper surface 2 includes the plane part 2a, and the lower surface 3 includes the plane part 3a. The plane part 2a and the plane part 3a each come into contact with a bottom surface 23 of an insert mounting part 22 of a tool body 21 described below. As shown in FIGS. 2 and 3, the plane part 2a and the plane part 3a extend around the mounting hole 9. The cutting edges 5 are located at a higher level than the plane part 2a and the plane part 3a. In other words, a distance from each portion of the first cutting edge 5a of the upper surface 2 to the lower surface 3 is longer than a distance from the plane part 2a of the upper surface 2 to the lower surface 3. Similarly, a distance from each portion of the second cutting edge 5b of the lower surface 3 to the upper surface 2 is longer than a distance from the plane part 3a of the lower surface 3 to the upper surface 2.

The intermediate peripheral side surface portion 4b of the cutting insert 1 comes into contact with a wall surface of the insert mounting part of the tool body described below.

Materials used for the cutting edges 5 of the cutting insert 1 and their peripheral areas are hard materials or materials obtained by applying a coating, via CVD, PVD, etc., to hard materials. As to such hard materials, cemented carbide, cermet, ceramic, a sintered body containing cubic boron nitride, a sintered body containing diamond, and monocrystalline diamond can be used. Materials for the portions other than the cutting edges 5 in the cutting insert 1 are preferably the same hard materials as those described above, etc.

Figure 7:
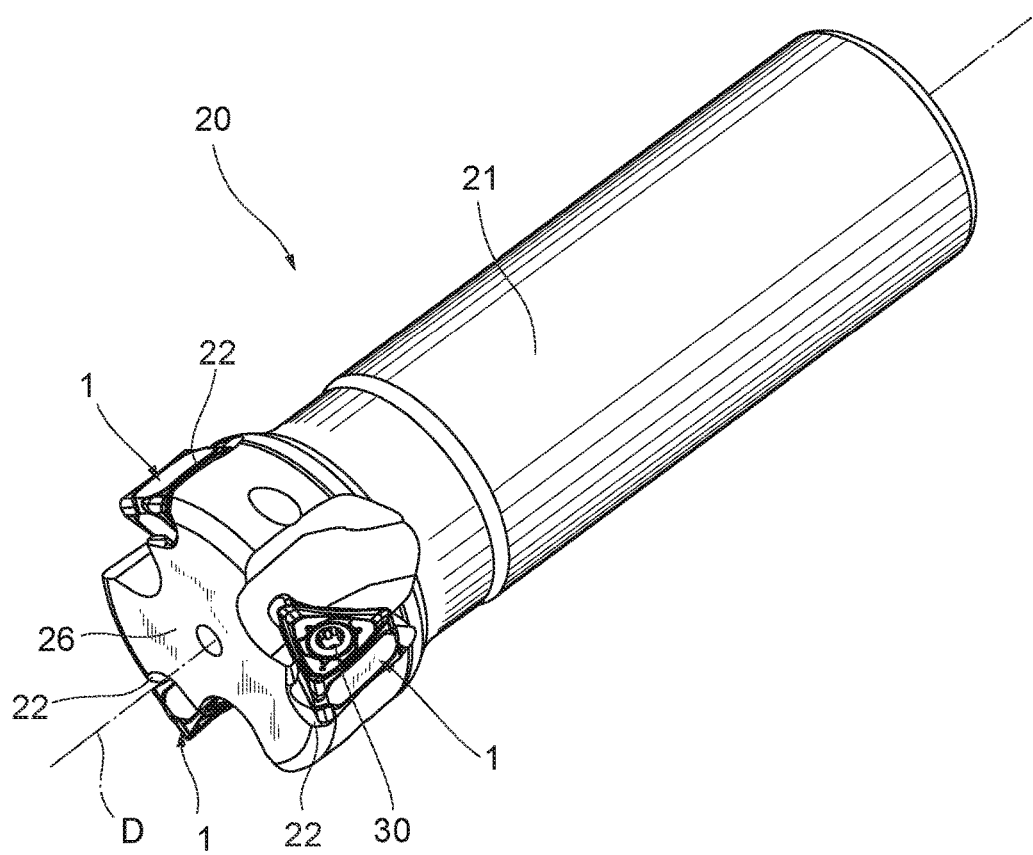
FIG. 7 is a perspective view of a cutting tool on which the cutting insert of FIG. 1 is mounted.

Next, description will be made regarding a cutting tool 20 on which the cutting insert 1 is mounted, with reference to FIGS. 7 and 8. The cutting tool 20 includes the above-described cutting insert 1 and the tool body 21 having a substantially cylindrical shape. As shown in FIG. 7, the cutting insert 1 is mounted on the insert mounting part 22 formed in the tool body 21. The cutting insert 1 is removably mounted by a clamping member serving as a mechanical mounting means. The cutting tool 20 includes a fastening screw 30 as a clamping member. It should be noted that the cutting tool 20 is suited mainly for square shoulder milling.

The tool body 21 has a central axis D which extends from a leading end 26 thereof toward a base end thereof. The leading end 26 of the tool body 21 is provided with insert mounting parts 22 for mounting cutting inserts 1. One cutting insert 1 can be removably mounted on each insert mounting part 22. In the tool body 21, three insert mounting parts 22 are arranged generally at equal distances in a circumferential direction about the central axis D. However, the present invention is not limited to the above configuration, and a tool body may be provided with insert mounting parts such that cutting inserts in various shapes may be mounted thereon, insert mounting parts may not be arranged at equal distances, and further, a cutting tool may include a tool body which is provided with a single insert mounting part.

Figure 8:
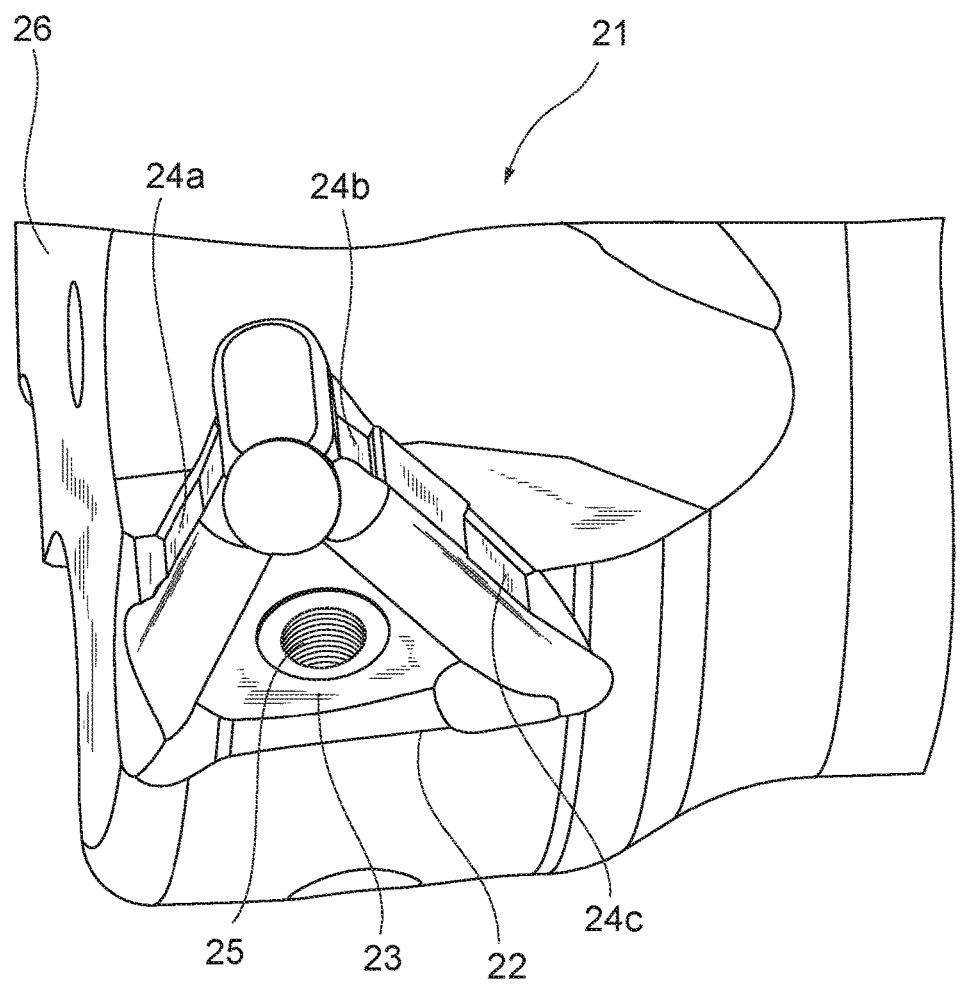
FIG. 8 is an enlarged view of a tool body of FIG. 7.

As shown in FIG. 8, the insert mounting part 22 includes the bottom surface 23 and wall surfaces 24a, 24b, 24c. The bottom surface 23 and the wall surfaces 24a, 24b, 24c are substantially planar. The bottom surface 23 is provided with a threaded hole 25.

The wall surfaces 24a, 24b, 24c extend in a direction substantially perpendicular to the bottom surface 23. The wall surface 24a is arranged so as to be directed toward the base end of the tool body 21, and the wall surfaces 24b, 24c are arranged so as to be directed toward the leading end 26 of the tool body 21. The wall surface 24b and the wall surface 24c are arranged so as to be apart from each other.

When the cutting insert 1 is mounted on the insert mounting part 22, the intermediate peripheral side surface portion 4b of the peripheral side surface 4 comes into contact with the wall surfaces 24a, 24b, 24c, and the plane part 2a or the plane part 3a comes into contact with the bottom surface 23. The cutting insert 1 is held between the wall surface 24a and the wall surfaces 24b, 24c.

The threaded hole 25 extends in a direction perpendicular to the bottom surface 23 and is screwed with the above-described fastening screw 30. In other words, the insert mounting part 22 has a shape which is the same as that of an insert mounting part on which a so-called negative type cutting insert is mounted. However, the present invention is not limited to such configuration, and the shape of the insert mounting part 22 may be any shape, as long as the plane part 2a or 3a of the cutting insert 1 comes into contact with the bottom surface 23 and as long as the cutting insert 1 can be fixed, and various known techniques are applicable here.

The cutting insert 1 is mounted on the insert mounting part 22 such that one of the major cutting edges 6a is arranged on the outer periphery side of the tool body 21. In further detail, the cutting insert 1 is mounted on the insert mounting part 22 at a posture in which, when rotating the cutting tool 20 about the central axis D, a rotational trajectory of the major cutting edge 6a creates a cylindrical surface which is generally parallel to the central axis D. Thus, when the cutting tool 20 is viewed from a direction facing the bottom surface 23 of one insert mounting part 22, the cutting insert 1 is mounted such that the major cutting edge 6a used for cutting is substantially parallel to the central axis D. As a result, the single cutting edge 5 is used for cutting.

Further, in order to prevent the peripheral side surface 4 from coming into contact with a surface of a workpiece, the cutting insert 1 is mounted so as to be inclined forward in a rotating direction of the cutting tool 20. In other words, the cutting insert 1 is mounted on the insert mounting part 22 such that, as in a so-called negative type cutting insert, the flank 4a is given an appropriate positive clearance angle. It should be noted that the same applies to the mounting of the cutting insert 1 in the case where any of the other five cutting edges 5 is used for cutting, and thus, the description thereof will be omitted here.

Next, description will be made regarding the operation and effects of the cutting insert 1 in the present embodiment and the cutting tool 20 on which such cutting insert 1 is removably mounted. Description will also be made regarding the preferred configurations.

The cutting tool 20 can be used for the cutting of steel, etc., by being attached to a machine tool such as a machining center. The cutting tool 20 is moved relative to a workpiece while being rotated around the central axis D. This allows cutting such as square shoulder milling to be performed.

The peripheral side surface 4 of the cutting insert 1 includes the intermediate peripheral side surface portion 4b which is protruding outward. The cutting edge 5, which is located on the side opposite to the cutting edge 5 in use for cutting and which is not in use for cutting, and the flank 4a are both covered by the intermediate peripheral side surface portion 4b in the thickness direction. Thus, it is possible to suppress damage to the cutting edge 5a which is not in use for cutting and the flank 4a due to collision with the residue produced during cutting.

When the amount of protrusion B of the intermediate peripheral side surface portion 4b from the flank 4a is less than 0.02 mm, the flank 4a is not sufficiently covered by the intermediate peripheral side surface portion 4b. As a result, the area around the cutting edge 5 which is not in use may be damaged. Further, if the amount of protrusion B is increased so as to be over 3 mm, the remarkable effect cannot be obtained. If the amount of protrusion B is excessively increased, there will be increasing concern that the intermediate peripheral side surface portion 4b will come into contact with a workpiece when mounting the cutting insert 1 on the cutting tool 20. Therefore, the amount of protrusion B is preferably from 0.02 mm to 3 mm.

The width C of the flank 4a in the thickness direction is preferably ten times or more of the amount of protrusion B. If the width C is less than 0.2 mm, it is difficult to allow the flank 4a to function as a flank. Further, an upper limit of the width C affects the thickness of the cutting insert 1. When the flank 4a is provided on each of the upper surface 2 side and the lower surface 3 side such that the width C exceeds 4 mm and also when the intermediate peripheral side surface portion 4b is provided, the cutting insert 1 becomes unnecessarily thick. Therefore, the width C of the flank 4a in the thickness direction is preferably from 0.2 mm to 4 mm.

As described above, this cutting insert 1 is a right-hand cutting insert. In other words, the upper surface 2 and the lower surface 3 do not constitute mirror symmetry. If such upper surface 2 and lower surface 3 were to be connected via a smooth peripheral side surface, the cutting insert would have a shape different from that of a so-called negative type cutting insert. More specifically, in such peripheral side surface, a portion thereof which is connected to the minor cutting edge 6c would be given a negative clearance angle. In such case, the clearance angle with regard to the cutting insert alone may vary in a complicated manner in accordance with the portion.

Meanwhile, the upper surface 2 and the lower surface 3 of the cutting insert 1 are connected via the peripheral side surface 4 including the intermediate peripheral side surface portion 4b. The intermediate peripheral side surface portion 4b protrudes from the flank 4a. Thus, even if the upper surface 2 and the lower surface 3 do not constitute mirror symmetry, the flank 4a can have a clearance angle of zero, as in the case of a so-called negative type cutting insert. Therefore, when mounting the cutting insert 1 on the cutting tool 20, an appropriate clearance angle can be provided as in the case of a so-called negative type cutting insert.

The shape of the first cutting edge 5a on the upper surface 2 side is the same as the shape of the second cutting edge 5b on the lower surface 3 side. Therefore, by changing the direction of the cutting insert 1, the positions of the cutting edges 5a, 5b are reversed such that each of the cutting edges 5a, 5b can be used for cutting. However, the present invention is not limited thereto and is also applicable to a cutting insert having differently shaped cutting edges between the upper surface side and the lower surface side. The effect of the present invention can be obtained, as long as an intermediate peripheral side surface portion protrudes outward from a flank which is connected to a cutting edge of at least one end surface. In other words, the present invention is applicable to a cutting insert which is used in a manner wherein the area around a cutting edge which is not in use is prone to be damaged.

The cutting insert 1 is a so-called negative type cutting insert. In other words, the first flank 4a1 and the second flank 4a2 respectively extend in directions which are respectively perpendicular to the plane part 2a of the upper surface 2 and the plane part 3a of the lower surface 3. Thus, in the cutting insert 1, not only the upper surface 2 but also the lower surface 3 can be provided with the cutting edges 5, which is economical. In addition, the usage of the cutting insert 1 is the same as in the case of a so-called negative type cutting insert. In other words, the cutting insert 1 is easy to use. The feature in which a clearance angle is not provided with regard to the cutting insert 1 alone is advantageous in that, while the damage to the area around the cutting edge which is not in use is suppressed, the intermediate peripheral side surface portion 4b is prevented from coming into contact with a workpiece. The reason for this is that, if a negative clearance angle is provided with regard to the cutting insert 1 alone, an appropriate clearance angle will be provided when the cutting insert 1 is mounted on the cutting tool, so that the peripheral side surface 4 will be greatly inclined, whereby the protrusion of the intermediate peripheral side surface portion 4b will be relatively less likely to provide the effect. Conversely, if a positive clearance angle is provided with regard to the cutting insert 1 alone, the intermediate peripheral side surface portion 4b will be relatively likely to protrude, and thus, the intermediate peripheral side surface portion 4b will easily come into contact with a workpiece.

The cutting insert 1 can be manufactured by known methods. The cutting insert 1 can be manufactured by subjecting powder of metal, etc., to pressure molding with the use of a mold and then subjecting the resultant product to sintering, grinding, application of a coating, etc. It should be noted, however, that, with a mold for a so-called negative cutting insert, it is difficult to obtain, via pressure molding, a major part of the shape of the peripheral side surface 4 in which the intermediate portion is protruding, and, after pressing, it is necessary to divide a mold so as to take a molded body out from such mold.

When pressure molding is performed in the thickness direction using a dividable mold (die), it is advantageous that, as in the present invention, the first flank 4a1 near the cutting edge is formed so as to extend in the direction perpendicular to the plane part 2a of the upper surface 2 because this allows for the adjustment of a molding position serving as one of the molding conditions. If the first flank 4a1 were to be given a positive or negative clearance angle, a molding position in the thickness direction would be determined by the shape of a mold. This makes it difficult to allow the adjustment of a molding position to be performed. In particular, when both an upper surface and a lower surface are provided with cutting edges, the adjustment of a molding position cannot be performed on the lower surface side.

Meanwhile, in the cutting insert 1 of the present invention, since the plane part 2a of the upper surface 2 and the first flank 4a1 are orthogonal to each other, a molding position in the thickness direction can be adjusted. In other words, the degree of freedom for the adjustment of the molding conditions is increased, whereby the thickness between the upper surface 2 and the lower surface 3 in the cutting insert 1 can be adjusted with a high degree of accuracy. It should be noted that the mold may be divided into two in the thickness direction or divided into portions in a lateral direction. In the case of dividing the mold in the lateral direction, it is preferable for the mold to be divided into three. However, if the mold is divided in the lateral direction, the cutting insert 1 is likely to involve more parting lines in the cutting edges 5, and thus, it is more preferable to divide the mold into two in the thickness direction. In the case of dividing the mold in the lateral direction, it is preferable to avoid dividing the mold at the positions of the cutting edges 5 and to divide the mold at the positions of the connecting portions between the cutting edges 5.

In the cutting tool 20 which allows for square shoulder milling, chips need to be discharged so as not to damage a wall surface which is machined in a workpiece. Further, cutting resistance needs to be decreased in order to prevent the generation of chattering. In order to meet such requirements, the cutting tool 20 includes the fastening screw 30. With the use of the fastening screw 30, the cutting insert 1 can be easily mounted even if its plane part 2a is located at a lower level than the cutting edge 5, i.e., the cutting insert 1 is formed so as to have a so-called raised cutting edge. Moreover, chips can be discharged easily as there are no obstacles, such as wedges or presser pieces, on the rake surface 6 side.

Although the embodiment of the present invention has been described above, various modifications can be made to the cutting insert and the cutting tool of the present invention. For example, the shape of the upper surface and the lower surface in the above-described embodiment is a triangular shape, but it may instead be another polygonal shape such as a quadrangular shape. When the shape of the upper surface of the cutting insert 1 is a triangular or quadrangular shape, the cutting insert may be designed so as to be suited for square shoulder milling regarding which the discharge of chips is important. In such case, the effect of suppressing damage to the area around the cutting edge which is not in use for cutting is further increased.

The present invention is not limited to a substantially cylindrical rotary cutting tool and is also applicable to other forms of cutting tools, including turning tools.

In the above-described embodiment, the present invention has been described specifically in a given way, but the present invention is not limited thereto. It should be appreciated that various alterations and changes can be made to the present invention without departing from the spirit and scope of the invention defined in the scope of the claims. That is, the present invention encompasses all kinds of modifications, applications and equivalents which are encompassed by the idea of the present invention defined by the scope of the claims.

REFERENCE SIGNS LIST

1 Cutting insert
2 Upper surface (first end surface)
2a Plane part
3 Lower surface (second end surface)
3a Plane part
4 Peripheral side surface
4a Flank
4a1 First flank
4a2 Second flank
4b Intermediate peripheral side surface portion
5 Cutting edge
5a First cutting edge
5b Second cutting edge
6a Major cutting edge
6b Corner cutting edge
6c Minor cutting edge
7 Rake surface
9 Mounting hole
20 Cutting tool
21 Tool body
22 Insert mounting part
23 Bottom surface of the insert mounting part
24a, 24b, 24c Wall surface of the insert mounting part
25 Threaded hole
26 Leading end
30 Fastening screw
A Reference axis of the cutting insert (central axis of the mounting hole)
B Amount of protrusion of the intermediate peripheral side surface portion from the first flank
C Width of the first flank
D Central axis

What is claimed is:

1. A cutting insert comprising:
a first end surface and a second end surface which are opposed to each other;
a peripheral side surface which extends so as to connect the first end surface and the second end surface;
a first cutting edge which is arranged in an intersecting edge between the first end surface and the peripheral side surface; and
a second cutting edge which is arranged in an intersecting edge between the second end surface and the peripheral side surface, wherein:
the peripheral side surface includes a first flank which is connected to the first cutting edge and an intermediate peripheral side surface portion which is arranged closer to the second end surface than the first flank;
the first flank extends in a direction perpendicular to the first end surface; and
the intermediate peripheral side surface portion protrudes outward from the first flank.

2. The cutting insert according to claim 1, wherein:
the peripheral side surface includes a second flank which is connected to the second cutting edge;
the second flank extends in a direction perpendicular to the second end surface; and
the intermediate peripheral side surface portion protrudes outward from the second flank.

3. The cutting insert according to claim 1, wherein the second cutting edge is 180-degree rotationally symmetrical with the first cutting edge.

4. The cutting insert according to claim 1, wherein, as viewed from a direction facing the first end surface, an amount of protrusion B of the intermediate peripheral side surface portion from the first flank is from 0.02 mm to 3 mm.

5. The cutting insert according to claim 1, wherein a width C of the first flank in a direction in which the first end surface and the second end surface are opposed to each other is from 0.2 mm to 4 mm.

6. The cutting insert according to claim 1, wherein a contour shape of the second end surface is not mirror symmetrical.

7. A cutting tool comprising the cutting insert according to claim 1 mounted thereon.

* * * * *